US012559902B2

(12) United States Patent
Ertmer et al.

(10) Patent No.: US 12,559,902 B2
(45) Date of Patent: Feb. 24, 2026

(54) ADD-ON MILLING UNIT WITH CROSS-CUTTING HEADS AT AN ANGLE TO EACH OTHER AND OUTPUT GEARS WITH BELEVOID TOOTHING

(71) Applicant: KEMROC Holding GmbH, Leimbach (DE)

(72) Inventors: Klaus Ertmer, Leimbach (DE); Mina Zeyada, Bad Salzungen (DE)

(73) Assignee: KEMROC HOLDING GMBH, Leimbach (DE)

( * ) Notice: Subject to any disclaimer, the term of this patent is extended or adjusted under 35 U.S.C. 154(b) by 477 days.

(21) Appl. No.: 18/179,712

(22) Filed: Mar. 7, 2023

(65) Prior Publication Data

US 2024/0125086 A1 Apr. 18, 2024

(30) Foreign Application Priority Data

Oct. 13, 2022 (DE) ......................... 102022126637.0

(51) Int. Cl.

*E02F 5/08* (2006.01)
*B02C 18/18* (2006.01)
*B02C 18/24* (2006.01)

(52) U.S. Cl.

CPC ................ *E02F 5/08* (2013.01); *B02C 18/18* (2013.01); *B02C 18/24* (2013.01)

(58) Field of Classification Search

CPC ..... E02F 5/08; E02F 3/20; E02F 3/202; E02F 3/24; E02F 3/246; B02C 18/18; B02C 18/24; E21B 3/00

(Continued)

(56) References Cited

U.S. PATENT DOCUMENTS 4,718,504 A * 1/1988 Terashima .............. E21B 7/001 175/102
7,096,609 B2 8/2006 Bainter (Continued)

FOREIGN PATENT DOCUMENTS

DE 3424999 C2 * 1/1994 ............ E02F 3/9237
DE 102008041982 A1 4/2010

(Continued)

OTHER PUBLICATIONS

DE-3424999-C2 (Year: 1994).*
WO-2021239225-A1 (Year: 2021).*

*Primary Examiner* — Christopher J Sebesta
*Assistant Examiner* — Evan A Bregel
(74) *Attorney, Agent, or Firm* — Kaplan Breyer Schwarz LLP

(57) ABSTRACT

A milling unit attachment is provided with two transverse cutter heads at an angle to each other. The milling unit attachment comprises a housing with a mounting bracket at the rear end of the milling unit attachment for fastening to a movable carrier arm of a carrier device, preferably an excavator or a similar construction machine. The milling unit attachment comprises at least one motor as well as a transmission unit. The transmission unit is arranged in the housing and is coupled on the drive side to at least one motor. Two transverse cutter heads rotationally driven via the transmission unit are mounted on either side of the longitudinal axis of the housing. Each transverse cutter head carries numerous router bits and each of the transverse cutter heads has a driven pinion shaft about which the transverse cutter head rotates.

10 Claims, 2 Drawing Sheets

(58) Field of Classification Search
USPC .................................... 37/91, 364, 365, 189
See application file for complete search history.

(56) References Cited

U.S. PATENT DOCUMENTS

| | | | | |
|---|---|---|---|---|
| 2005/0229440 | A1 | 10/2005 | Arzberger | |
| 2018/0142439 | A1 * | 5/2018 | Azzolin .................. | E02F 3/246 |
| 2019/0106855 | A1 * | 4/2019 | Laghi ...................... | E02D 17/13 |

FOREIGN PATENT DOCUMENTS

| | | | | | |
|---|---|---|---|---|---|
| DE | 10041275 | A1 | | 3/2022 | |
| EP | 1580327 | A1 | | 9/2005 | |
| WO | WO-2021239225 | A1 | * | 12/2021 | ............. E02F 3/205 |

* cited by examiner

ADD-ON MILLING UNIT WITH CROSS-CUTTING HEADS AT AN ANGLE TO EACH OTHER AND OUTPUT GEARS WITH BELEVOID TOOTHING

BRIEF DESCRIPTION OF THE INVENTION

The invention relates to a milling unit attachment with two transverse cutter heads at an angle to each other. The milling unit attachment comprises a housing with a mounting bracket at the rear end of the milling unit attachment for fastening to a movable carrier arm of a carrier device, preferably an excavator or a similar construction machine. Moreover, the milling unit attachment comprises at least one motor as well as a transmission unit, which transmission unit is arranged in the housing and coupled on the drive side to at least one motor. Lastly, two transverse cutter heads rotationally driven via the transmission unit are mounted on either side of the longitudinal axis of the housing, wherein each transverse cutter head carries numerous router bits and wherein each of the transverse cutter heads has a driven pinion shaft about which the transverse cutter head rotates.

The field of application for such an attachment milling system is, in particular, sewer construction, road construction, special civil engineering, tunnel construction or hydraulic engineering. The cutter attachment is used, for example, to break up sealed surfaces, however also for concrete demolition and for excavation of certain layers of earth and rock strata.

Excavator cutter attachments are already known, which are configured as transverse cutter head cutters and are equipped with hard metal-tipped round shank bits as cutting tools. When using this type of cutter, the cutter must usually be swiveled back and forth sideways in order to thereby break the material between the cutting heads. The disadvantage of these cutters is that the cutting width is greater than the actual width of the cutter head, which is particularly disadvantageous in sewer construction. A further disadvantage of these cutters is the load on the swing gear of the excavator, which swing gear is constantly subjected to high torsional and shear forces during cutting.

Excavator milling attachments are also often used for excavation of soft and medium-hard rock, such as limestone or gypsum. It is particularly important in gypsum excavation that the fine material in the milled material is kept as low as possible. The use of excavator milling attachments with lateral cutting heads that are swiveled on the excavation wall causes the material broken off by the front cutting head to be further comminuted by the following cutting head, which is undesirable.

DE 100 41 275 B4 describes a milling system for fastening to hydraulic carrier devices, which devices consist of two or a plurality of milling machine attachments of the same or different design, each driven separately and simultaneously by a hydraulic motor, with the same or different tool carriers. The individual milling machine attachments are arranged at the same or different heights, either side by side, one behind the other or at an angle to each other, and can be exchanged via connecting brackets. This is intended to make it possible to excavate material more efficiently from the front of the carrier device. This milling system is, however, costly and not very suitable, for example, for trench construction.

A so-called trencher is known from U.S. Pat. No. 7,096,609 B2, which trencher is equipped with a mortising chain. The trencher comprises screw shafts mounted vertically to the direction of travel of the mortising chain, which push away the removed soil from the excavated trench. A disadvantage here is the limited applicability of this machine. The trencher is unsuitable for large-scale material excavation from a wall. Due to its highly executed construction, the trencher is moreover also subjected to high mechanical stresses. The forces occur not only in the longitudinal direction of the rotating mortising chain, but also perpendicular to the mortising chain, in particular when the milling tool hits obstacles such as stones or similar.

DE 10 2008 041 982 A1 describes an attachment milling system for fastening to a movable carrier arm of a carrier device. The attachment milling system comprises an mounting bracket to which rotating cutting heads are attached on both sides of the longitudinal axis of the attachment bracket. Moreover, this attachment milling system comprises a rotating mortising chain with a running direction that is parallel to the longitudinal axis of the mounting bracket and that extends between the two cutting heads. Numerous router bits are attached to the mortising chain and the cutting heads, which describe a cylindrical milling lateral surface when the cutting heads are rotated. The router bits of the mortising chain form a semi-cylindrical outer surface at the exposed front end of the mortising chain. The front reversal line of the mortising chain lies substantially in a plane tangent to the milling lateral surfaces of the two cutting heads. The lines of contact of the router bits of the cutting heads with the surface to be milled thus lie directly next to the line of contact of the router bit of the mortising chain, without any appreciable gap, which in the case of devices without a mortising chain is determined by the width of the mounting bracket. Expediently, these lines of contact also lie in a common plane. While it is true that this makes it possible to machine an uninterrupted milling surface, which makes the need for an oscillating transverse movement of the attachment milling system redundant, the construction of such a system is comparatively expensive and the mortising chain, in particular, is subject to heavy wear.

WO 2021/239225 A1 describes a drum cutting assembly for a carrier vehicle. The drum cutting assembly comprises a main element having a longitudinal extension; a first and a second rotatable cutting drum which are connected to the main element and disposed on opposite sides of the main element; and a drive system that is arranged in such a way that it drives the first and second cutting drums. The first cutting drum is rotatable about a first axis and the second cutting drum is rotatable about a second axis. With respect to a first plane, the first axis and the second axis are perpendicular to the longitudinal extension of the main element, wherein an angle is enclosed between the first axis and the second axis. A complex transmission is formed to drive the two cutting drums. The main element has at least one central spur gear with two laterally mounted bevel gears, which cooperate with two other bevel gears associated with the cutting drums. In this way, two bevel gear sets (double bevel gear pairing), each consisting of two bevel gears, are symmetrically arranged on opposite sides of the central spur gear. The main element is thus composed of three gears, namely a central spur gear and two lateral bevel gears, the latter lateral bevel gears driving the other bevel gears located on the shafts of the cutting drums. This construction is very costly and prone to failure.

SUMMARY OF THE INVENTION

The task of the invention, based on the prior art, is to provide an improved milling unit attachment for fastening to a movable carrier arm of a carrier device, which is simpler and less expensive to manufacture, while concurrently permitting the production of an substantially uninterrupted milling surface without requiring, for this purpose, a constant pendulum movement of the carrier arm and the milling unit attachment attached thereto. In particular, the drive gear should be inexpensive and resilient.

This task is solved by a milling unit attachment according to claim 1.

In the milling unit attachment according to the invention, the two pinion shafts of the transverse cutter heads are arranged at an angle to each other, each forming an acute angle with the longitudinal axis of the housing on the side facing away from the mounting bracket. This leads to the situation where on the side facing the front end of the milling unit attachment, an angle in the range of 135° to 175°, preferably in the range of 160° to 170°, is formed between the two pinion shafts of the transverse cutter heads. The transverse cutter heads are thus inclined towards each other, such that the milling surfaces described by the rotating milling heads have a smaller distance from each other on the forward-facing side of the transverse cutter heads than on the rearward-facing side. In particular, the distance between the milling surfaces described is smaller than the width of the housing, preferably smaller than half the width of the housing of the milling unit attachment on the rear-facing side of the transverse cutter heads. In the preferred case, the distance between the milling surfaces described consequently amounts to only a few centimeters.

Moreover, the invention is characterized in that the transmission unit comprises a drive spur gear, the axis of rotation of which runs perpendicular to the longitudinal axis of the housing. The lines of the heads of the individual gearing of the drive spur gear thus run transversely to the longitudinal axis of the housing and thus preferably parallel to the milling line of contact described during rotation of the transverse cutter heads at the front end of the milling unit attachment. Moreover, an output gear wheel with conical involute gears (also called conical spur gears) is mounted on each of the two pinion shafts of the transverse cutter heads, wherein the conical involute gears of each output gear wheel engage directly in an associated section of the spur gearing of the drive spur gear.

In this way, the invention makes it possible to reduce to a minimum the area between the cutting heads that cannot be reached by the milling heads of the transverse cutter heads, this without the need for a mortising chain running between the cutting heads, and at the same time to use a stable, low-wear and low-maintenance transmissions equipped with fewer gears.

When compared to the prior art, the use of conical involute gears permits a significantly simplified and, above all, more compact construction, since no double bevel gear sets are used and thus only one spur gear with straight gearing and two conical involute gears are required, which are driven directly by the straight gearing.

Preferably, each of the two output gear wheels is also provided with internal gearing, which internal gearing is placed on external gearing of a geared connecting shaft. The connecting shaft connects the internal gearing of the pinion shaft to the internal gearing of the output gear wheel carrying the conical involute gears. The pinion shaft is preferably mounted in an output housing with two tapered roller bearings. The right or alternatively the left transverse cutter head is then mounted on the pinion shaft.

According to a modified embodiment, the transmission unit comprises two parallel partial drive spur gears the common axis of rotation of which is perpendicular to the longitudinal axis of the housing. In this case, too, an output gear wheel with conical involute gears is mounted on each of the two pinion shafts, wherein the conical involute gears of each output gear wheel engage in the spur gearing of one of the two drive spur gears.

Particularly preferably, during their rotation, the router bits of each transverse cutter head describe a truncated conical milling lateral surface. In particular, at the front end of the milling unit attachment, the two truncated conical milling lateral surfaces are tangential to a common milling contact plane, which is to say, the milling line of contact, which is defined in sections by the two transverse cutter heads standing next to each other, extends in a common plane which is preferably perpendicular to the longitudinal axis of the housing.

An advantageous embodiment is characterized in that the motor is a hydraulic motor, which is preferably mounted on a side surface of the housing, or alternatively can also be enclosed in the housing. According to a further modified embodiment, the milling unit attachment may comprise two hydraulic motors, which are preferably attached to opposite side faces of the housing. The two hydraulic motors may be used together to drive the drive spur gear or to drive two independently rotatable drive gears. In the latter case, the two transverse cutter heads are driven independently of each other, which enables separate rpm control and is, for example, usable to allow one of the two transverse cutter heads to rotate more slowly than the other or even to stop it completely under certain conditions. This allows, for example, curved trenches to be milled more easily and with less wear on the transverse cutter heads.

Preferably, the transmission unit comprises at least one drive pinion, which is directly or indirectly in driving engagement with the drive spur gear via further gears.

BRIEF DESCRIPTION OF THE DRAWINGS

Further advantages and details of the invention will be apparent from the following description of preferred embodiments, with reference to the drawing. Wherein.

DETAILED DESCRIPTION OF THE INVENTION

Figure 1:
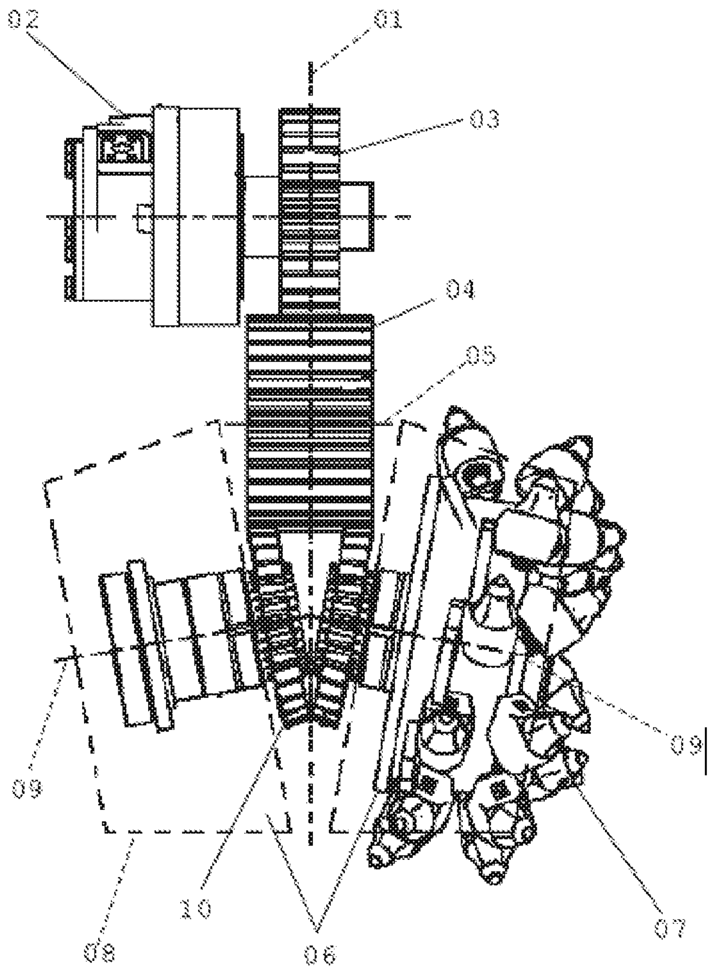
FIG. 1 shows a schematic diagram of a first embodiment of a milling unit attachment according to the invention.

FIG. 1 shows a milling unit attachment in a principle view, in which a housing and a mounting bracket, which bracket serves to attach the milling unit attachment to the support arm of an excavator or the like, are not shown for simplification. The housing, which is not shown, does however have a longitudinal extension described by a longitudinal axis 01. In this embodiment, the milling unit attachment has a high-torque motor 02, which is mounted on one side of the housing and is preferably supplied with power by the hydraulic system of the excavator. Alternatively, an electric motor can be used.

A transmission unit is arranged inside of the housing, which transmission unit is driven by the motor 02. In the embodiment shown, the transmission unit comprises a drive pinion 03, which is flanged directly onto the motor shaft. Moreover, the transmission unit comprises a drive spur gear 04 the axis of rotation 05 of which is perpendicular to the longitudinal axis 01 of the housing.

The milling unit attachment has two transverse cutter heads 06 which are driven in rotation via the transmission unit, which cutter heads are mounted on both sides of the longitudinal axis 01 of the housing and carry numerous router bits 07, wherein the router bits are shown only in the case of the transverse cutter head located on the right in the drawing. During rotation of the transverse cutter heads 06, these router bits 07 describe a truncated conical milling lateral surface 08 symbolized by dashed lines. Each transverse cutter head 06 is seated on a driven pinion shaft 09 about which the transverse cutter head rotates. The two pinion shafts 09 of the transverse cutter heads are arranged at an angle to each other. Preferably, they enclose an angle in the range from 150° to 170°. The enclosed angle is preferably selected in such a way that the truncated conical milling lateral surfaces 08 lie with their lateral line or line of contact facing the milling surface in a common plane, which plane is vertical to the longitudinal axis 01 of the housing. In other words, the pinion shafts 09 respectively enclose an acute angle with the longitudinal axis 01 of the housing at the front end, preferably at an angle of approx. 75° to 85°.

In order to set the transverse cutter heads into rotation, an output gear wheel 10 with conical involute gears is respectively mounted on each pinion shaft 09, wherein the conical involute gears of each output gear wheel 10 engage directly in an associated section of the spur gearing of the drive spur gear 04.

Figure 2:
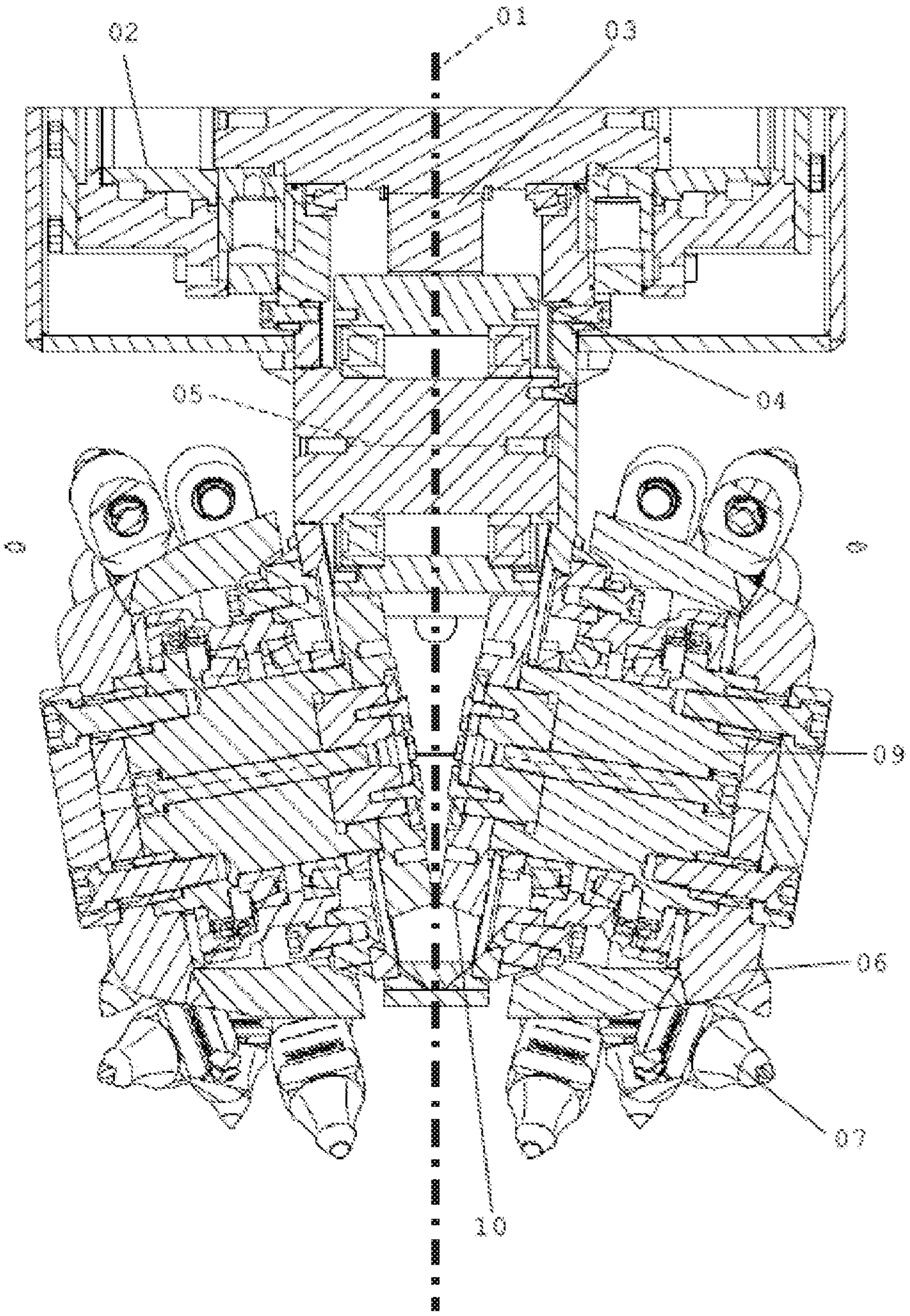
FIG. 2 shows a cross-sectional drawing of a second embodiment of the milling unit attachment.

FIG. 2 shows a modified embodiment of the milling unit attachment in a cross-sectional view. The direct engagement of the conical involute gears of the output gear wheels 10 in the associated, lateral sections of the straight gearing of the drive gear 04 is clearly visible here. On the side opposite the circumference of the drive gear 04, the drive pinion 03 engages in the central area of the gearing. This arrangement has the advantage that there is uniform application of load and thereby uniform wear occurs over the gearing surface on the drive gear. Whereas the driving force is applied to the central area of the gearing, it is dissipated to the output gear wheels 10 at the lateral area of the gearing, which are not brushed by the drive pinion 03. The special conical involute gears nevertheless ensure that the gearing does not change in the axial direction of the drive pinion, which is to say, along the individual tooth flanks, whereby a simple and inexpensive production of the drive pinion remains possible.

The invention claimed is:

1. Milling unit attachment comprising:

a housing with a mounting bracket at the rear end of the milling unit attachment for fastening to a movable carrier arm of a carrier device, wherein the housing extends along a longitudinal axis (01);

at least one motor (02);

a transmission unit which is arranged in the housing, is coupled on the drive side to the at least one motor (02) and comprises a drive spur gear (04), the axis of rotation (05) of which runs perpendicular to the longitudinal axis (01) of the housing;

two transverse cutter heads (06), which are rotationally driven via the transmission unit, and which are mounted on either side of the longitudinal axis (01) of the housing and carry numerous router bits (07), wherein each of the transverse cutter heads (06) has a driven pinion shaft (09), about which the transverse cutter head (06) rotates, wherein the two pinion shafts (09) of the transverse cutter heads (06) are arranged at an angle to each other and respectively form an acute angle with the longitudinal axis (01) of the housing on the side facing away from the mounting bracket;

wherein an output gear wheel (10) with conical involute gears is mounted on each of the pinion shafts (09), wherein the conical involute gears of each output gear wheel (10) engage directly in an associated section of the spur gearing of the drive spur gear (04), wherein each of the two output gear wheels (10) is provided with an internal gearing which is placed on external gearing of a geared connecting shaft.

2. Milling unit attachment according to claim 1, wherein the drive spur gear of the transmission unit is divided into two partial drive spur gears which are parallel to each other, the common axis of rotation of which is perpendicular to the longitudinal axis (01) of the housing, and the conical involute gears of the output gear wheel (10) mounted on the pinion shafts (09) respectively engage in the spur gearing of one of the two partial drive spur gears.

3. Milling unit attachment according to claim 1, wherein, during their rotation, the router bits (07) of each transverse cutter head (06) describe a truncated conical milling lateral surface (08).

4. Milling unit attachment according to claim 3, wherein at the front end of the milling unit attachment, the two truncated conical milling lateral surfaces (08) are tangential to a common milling contact plane.

5. Milling unit attachment according to claim 1, wherein the motor (02) is a hydraulic motor mounted on a side surface of the housing.

6. Milling unit attachment according to claim 1, wherein it the at least one motor comprises two hydraulic motors that are mounted on opposite side surfaces of the housing.

7. Milling unit attachment according to claim 1, wherein the transmission unit comprises at least one drive pinion (03), which is directly or indirectly in driving engagement with the drive spur gear (04) via further gears.

8. Milling unit attachment according to claim 1, wherein on the side facing the front end of the milling unit attachment, an angle in the range of 150° to 170° is formed between the two pinion shafts (09) of the transverse cutter heads (06).

9. Milling unit attachment according to claim 1, wherein the distance between the milling lateral surfaces (08) described by the transverse cutter heads (06) is smaller than the width of the housing.

10. Milling unit attachment according to claim 1, wherein the distance between the milling lateral surfaces (08) described by the transverse cutter heads (06) is smaller than half the width of the housing of the milling unit attachment on the rear-facing side of the transverse cutter heads.

* * * * *